(12) United States Patent
Rottenkolber et al.

(10) Patent No.: US 7,360,514 B2
(45) Date of Patent: Apr. 22, 2008

(54) METHOD FOR OPERATION OF AN INTERNAL COMBUSTION ENGINE

(75) Inventors: Gregor Rottenkolber, Munich (DE); Fabian Balles, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/604,790

(22) Filed: Nov. 28, 2006

(65) Prior Publication Data

US 2007/0068156 A1    Mar. 29, 2007

Related U.S. Application Data

(63) Continuation of application No. PCT/EP2005/005516, filed on May 20, 2005.

(30) Foreign Application Priority Data

May 29, 2004  (DE)  ............... 10 2004 026 405

(51) Int. Cl.
 F01L 1/34    (2006.01)
(52) U.S. Cl. ............... 123/90.15; 123/90.17; 123/403
(58) Field of Classification Search ........... 123/90.15, 123/90.16, 90.17, 90.18, 90.27, 90.31, 399, 123/403, 559.1
See application file for complete search history.

(56) References Cited

U.S. PATENT DOCUMENTS

2003/0183202 A1   10/2003   Mischker et al.

FOREIGN PATENT DOCUMENTS

| DE | 2942326 A | * | 4/1981 |
| DE | 102 32 942 A1 | | 2/2004 |
| GB | 746800 | * | 3/1956 |
| JP | 08296469 A | * | 11/1996 |
| JP | 2003-41960 A | | 2/2003 |

OTHER PUBLICATIONS

Salber W. et al.: "Der Elektomechanische Ventiltrieb-Systembaustein Fuer Zukuenftige Antriebskonzepte Teil 2" MTZ Motortechnische Zeitschrift, Vieweg, Wiesbaden, DE, vol. 62, No. 1, Jan. 2001, pp. 44-55, XP-001001079.
International Search Report dated Aug. 29, 2005 with English translation (Six (6) Pages).
German Office Action dated Mar. 18, 2005 with English translation (Seven (7) Pages).
US 6,336,441, 01/2002, Russell et al. (withdrawn)

* cited by examiner

*Primary Examiner*—Ching Chang
(74) *Attorney, Agent, or Firm*—Crowell & Moring LLP

(57) ABSTRACT

A process for operating an internal combustion engine with a charging device such as a turbocharger and with an intake valve drive mechanism which is variable with respect to its intake valve control times and/or its intake valve stroke. Upon recognition of a positive charge requirement during the operation of the charging device, the at least one variable intake valve drive mechanism is driven in such a manner that an available stroke reserve and/or intake closure control time reserve is utilized to increase the charge amount introduced into an engine cylinder.

4 Claims, 3 Drawing Sheets

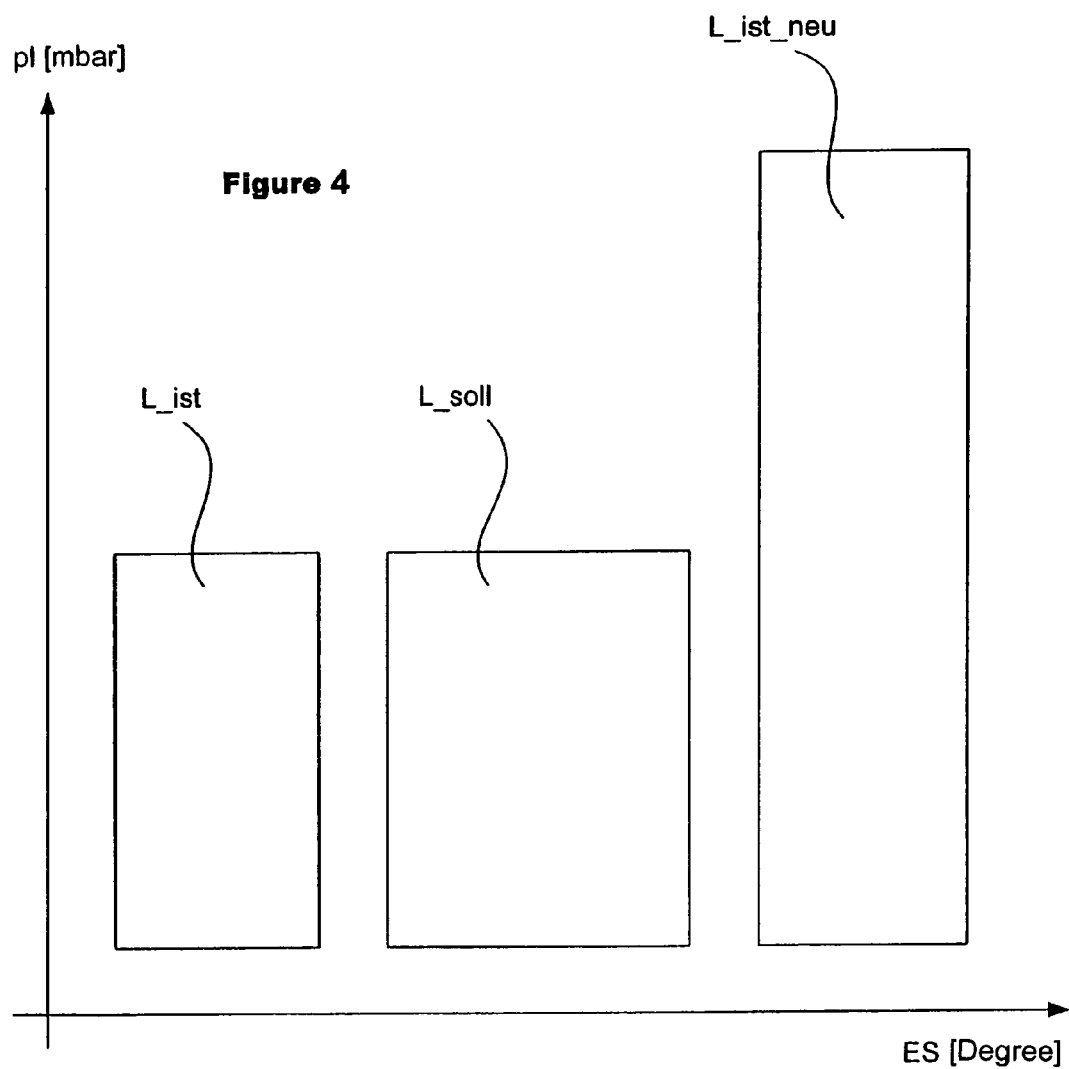

METHOD FOR OPERATION OF AN INTERNAL COMBUSTION ENGINE

This application is a Continuation of International Patent Application No. PCT/EP2005/005516, filed May 20, 2005, and claims the priority of DE 10 2004 026 405.8, filed May 29, 2004, the disclosures of which are expressly incorporated by reference herein.

BACKGROUND AND SUMMARY OF THE INVENTION

The invention relates to a process for operating an internal combustion engine, in particular for operating an internal combustion engine for a motor vehicle equipped with a charging device such as a turbocharger.

The charge control in an internal combustion engine with a variable valve drive mechanism is essentially determined by, on the one hand, the intake valve stroke and/or the intake control time during which an intake valve frees the intake opening to the combustion space and thus the available air mass or charge can be supplied to the combustion space (or the charge is sucked in) and, on the other hand, due to the density of the available charge. The density, and thus the compression of the available charge, in an internal combustion engine with a charging device is in turn dependent on the type of charging device as such as well as on the type of operation and the particular operating point of the charging device used. In an exhaust gas turbocharger schematically indicated in FIG. 1 the pressure built up by the exhaust gas turbocharger is dependent on the position of the valve of a bypass, which is present in given cases, and the state prevailing in the exhaust tract (pressure, temperature, exhaust gas speed, . . . ). An increase of the charge amount for the combustion space can be accomplished, in one way, by lengthening the intake valve open time and, in another way, by increasing the charge pressure in the suction tract.

For operating an internal combustion engine with variable control of the gas exchange valves (in the following called valves), various processes are already known. In the MTZ Motortechnische Zeitschrift [JMT, Journal of Motor Technology] No. 62, pages 44-55, Der elektromagnetische Ventiltrieb—Systembaustein für zukünftige Antriebskonzepte [The Electromagnetic Valve Drive Mechanism—The System Building Block for the Drive Mechanism Concepts of the Future], Part 2, from the year 2001, describes, among other things, charge control of an internal combustion engine with a variable valve drive mechanism with the aid of the early intake closure control process and the late intake closure control process.

The early intake closure charge control process, or the late intake closure charge control process, is understood in the sense of the invention to mean a charge control process for an internal combustion engine, with a variable valve drive mechanism and without a charging device or without operation of the charger, in which the charge amount to be developed in each case based on a charge requirement is regulated via the open time or the control times of the intake valves.

In the early intake closure charge control process the driving is done in such a manner that the intake valves each remain open only up to the precise moment the desired charge amount is reached (intake valves open for a minimum time). In the late intake closure charge control process the driving of the intake valves is done in such a manner that they are open beyond the time required for the desired charge amount and the charge amount sucked in thereby, which is too much in comparison to the desired minimum charge amount, is expelled once again before the closing of the intake valve.

An extension of this charge control process is known through the so-called Miller process applied in many cases in internal combustion engines with a variable valve drive mechanism and a charging device, where in this Miller process, in the sense of the invention, the control of the desired charge amount is accomplished by driving the variably controllable intake valves according to the early intake closure charge control process or late intake closure charge control process in connection with the active operation of a charger.

In conventional naturally aspirating engines with a variable valve drive mechanism the pre-controlled charge corresponds, due to the cycle consistency at any time, therefore also in non-steady-state operation of the motor, to the motor charge actually present. It is problematic that in a supercharged motor with a variable valve drive mechanism it cannot be ensured that the pre-controlled charge also corresponds to the charge actually present in the next cycle since the charge pressure which is required to reach the desired charge cannot be presented in the following operational cycle. Thus, in non-steady-state operation there is always a difference between the charge pressure which is required and the charge pressure which is actually present. The change in the charge desired by the driver or a regulation system cannot be presented immediately due to the time delay of the build-up of charge pressure (a so-called turbolag).

The invention is based on the concept of charge control according to the above-described Miller process (early/late intake closure in connection with the operation of a charger). It is intended to specify a process by means of which one improves the non-steady-state response behavior of a supercharged internal combustion engine with a variable valve drive mechanism at least on the intake side. In particular, shorter times for meeting charge requirements which occur is intended to be ensured.

According to the invention this objective is realized as follows. Due to the fact that in an internal combustion engine during the operation of the charger a reserve (control time reserve or stroke reserve) available with respect to the intake closure control time and/or the stroke of a variable intake valve drive mechanism which is present is utilized in addition by in each operating cycle of the internal combustion engine an increased charge amount (in particular air mass) being supplied to the combustion space until the predefined theoretical charge is reached, the time required to meet the charge requirement can be reduced significantly and thus the response time of the internal combustion engine can be shortened.

Preferably, in the process according to the invention, the charger device is operated in such a manner that it is always provides the maximum possible charge pressure. For example, a controllable bypass device, as is present as a rule in an exhaust gas turbocharger, could thus be omitted. It is only important to the invention that at least, starting from a charge pressure increased in comparison to the present ambient pressure, a charge pressure increased still further is produced.

The intake valve drive mechanism in steady-state operation (without a sudden variation in the charge) is preferably driven in such a manner that (with respect to valve stroke and/or intake closure control time) at the maximum possible charge pressure the minimum charge amount required to meet the charge requirement is always precisely provided (early/late intake closure control process and/or intake valve stroke control). Due to this, during steady-state operation below the full charge (maximum developable motor charge, predefined by the motor control based on specific motor data) the described callable reserve with respect to valve stroke and/or intake closure control time (difference of the control time with minimum charge amount and the control time at UT or in the area of UT) is available.

If, after an, in particular sudden, charge requirement and a reserve call based on the charge requirement (for example, by lengthening the intake valve open time), perhaps due to a desire of the driver, the predefined target charge is reached, the at least one variable intake valve drive mechanism is preferably driven in such a manner that a certain reserve, in particular the intake closure control time reserve and/or stroke reserve originally present are/is restored.

Other objects, advantages and novel features of the present invention will become apparent from the following detailed description of the invention when considered in conjunction with the accompanying drawings.

BRIEF DESCRIPTION OF THE DRAWINGS

The invention will be explained below in more detail with the aid of the figures. Shown are:

FIG. 4 is a bar diagram to illustrate the process according to the invention.

DETAILED DESCRIPTION

Figure 1:
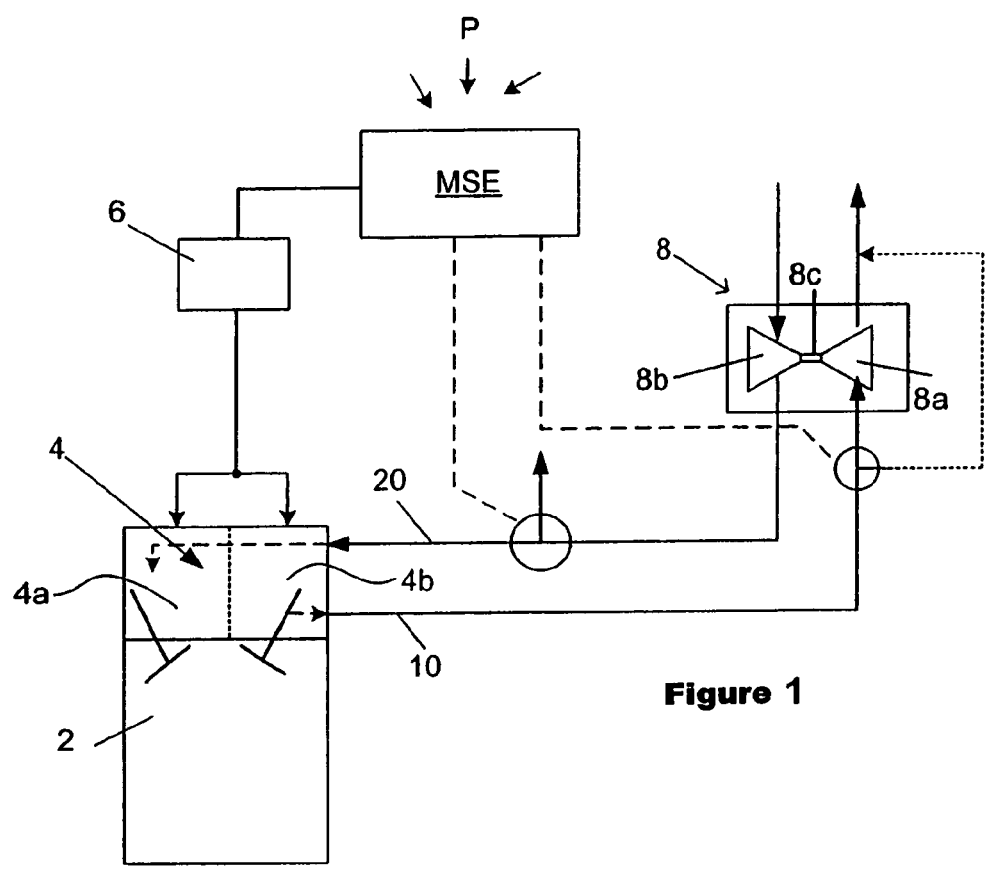
FIG. 1 is a schematic representation of an internal combustion engine with a charger device and a variable valve drive mechanism in accordance with am embodiment of the present invention.

FIG. 1 shows in a highly schematic representation an internal combustion engine 2 with an electromagnetic fully variable valve drive mechanism 4 (with variable intake valve drive mechanism 4a and variable exhaust valve drive mechanism 4b) and a control device 6 for the targeted driving of the electromagnetic variable valve drive mechanism 4. A fully variable valve drive mechanism of this type can, for example, be designed as an electrical, electromagnetic, or hydraulic mechanism. An essential feature of a drive mechanism of this type is the individual drivability or displaceability of individual valves or groups of valves. The internal combustion engine 2 is connected on the exhaust gas side via an exhaust gas line 10, and on the intake side via an intake line 20, to a charger device 8 (for example, an exhaust gas turbocharger). Through the exhaust gas flow produced by the internal combustion engine 2 the charger device 8 can be driven via its turbine wheel 8a. The turbine wheel 8a of the charger device 8 is connected via a shaft 8c to a compressor wheel 8b so that through the drive mechanism of the turbine wheel 8a, and, necessarily associated therewith, the drive mechanism of the compressor wheel 8b, fresh air is sucked in from outside and is compressed in the suction tract of the internal combustion engine 2. Thereby, clear increases in performance of the internal combustion engine 2 are possible. The control device 6 receives the information required for driving the electromagnetic valve drive mechanism 4 via a motor control device MSE as a function of the most varied operational parameters P.

Figure 2:
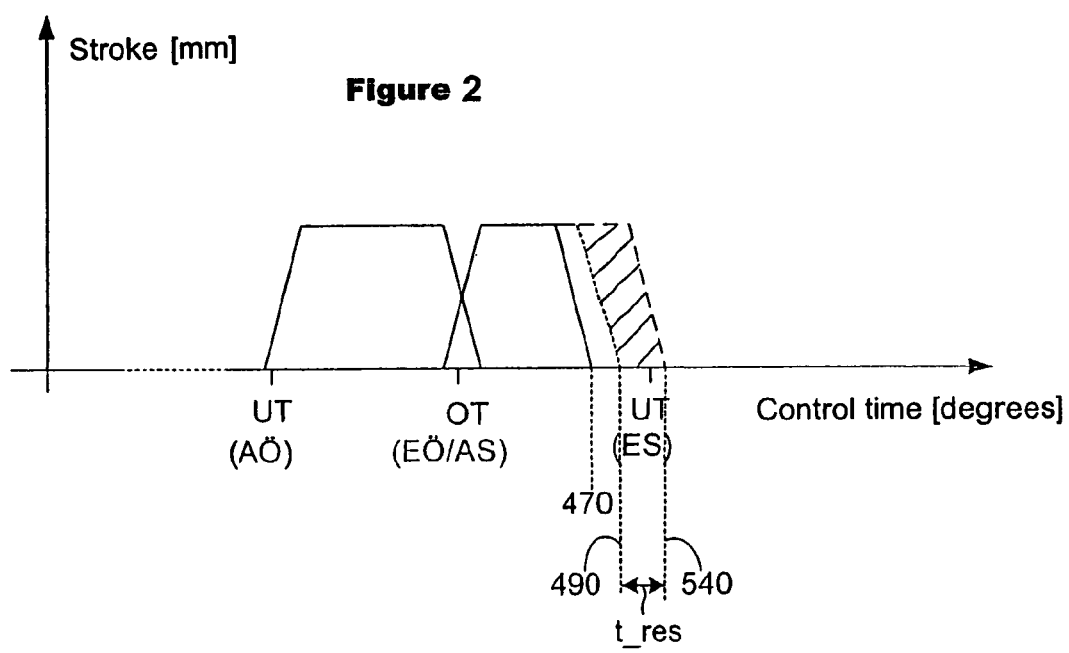
FIG. 2 is a valve-control time diagram for the charge control of an internal combustion engine in the FIG. 1 schematic representation.

FIG. 2 shows schematically the course of the opening and closing phases of the intake valve and the exhaust valve of the combustion chamber of an Otto motor. Therein the exhaust valve begins to open (AÖ) in the area of the bottom dead center UT of the piston of the internal combustion engine in order to expel the exhaust gas remaining from the last combustion cycle. In the area of the upper dead center OT the exhaust valve is closed once again (AS) while the intake valve of the same combustion chamber begins to free the intake channel for filling the combustion chamber (EÖ). The intake valve will close the intake channel once again as soon as possible as a function of the required charge in a control process according to early intake closure (ES) as soon as a sufficient charge amount for meeting the charge requirement is present. The required minimum charge amount is determined with the aid of computer models by the motor control device MSE. Due to the early intake closure charge control process in steady-state operation of the internal combustion engine 2 (below the full charge operation) an open time reserve (intake closure control time reserve t_res) of the intake valve remains. In the present example the intake valve in the current cycle has already closed at circa 470 degrees. Due to a positive charge requirement (a sudden variation in the charge) the intake valve would close in the next cycle as early as possible, e.g., at 490 degrees, in order to meet the existing charge requirement. Up to the control time of the full charge (area of the bottom dead center UT in the suction cycle) an open time reserve t_res of circa 50 degrees accordingly still remains. According to the process according to the invention the entire open time reserve t_res, or alternatively at least a part thereof, is used to accelerate the filling of the combustion space. Upon recognition of a positive sudden variation in the charge an increased charge amount for the filling of the combustion space is accordingly supplied under increased, in particular maximum, charge pressure using an available (opening time) reserve per cycle.

Figure 3A:
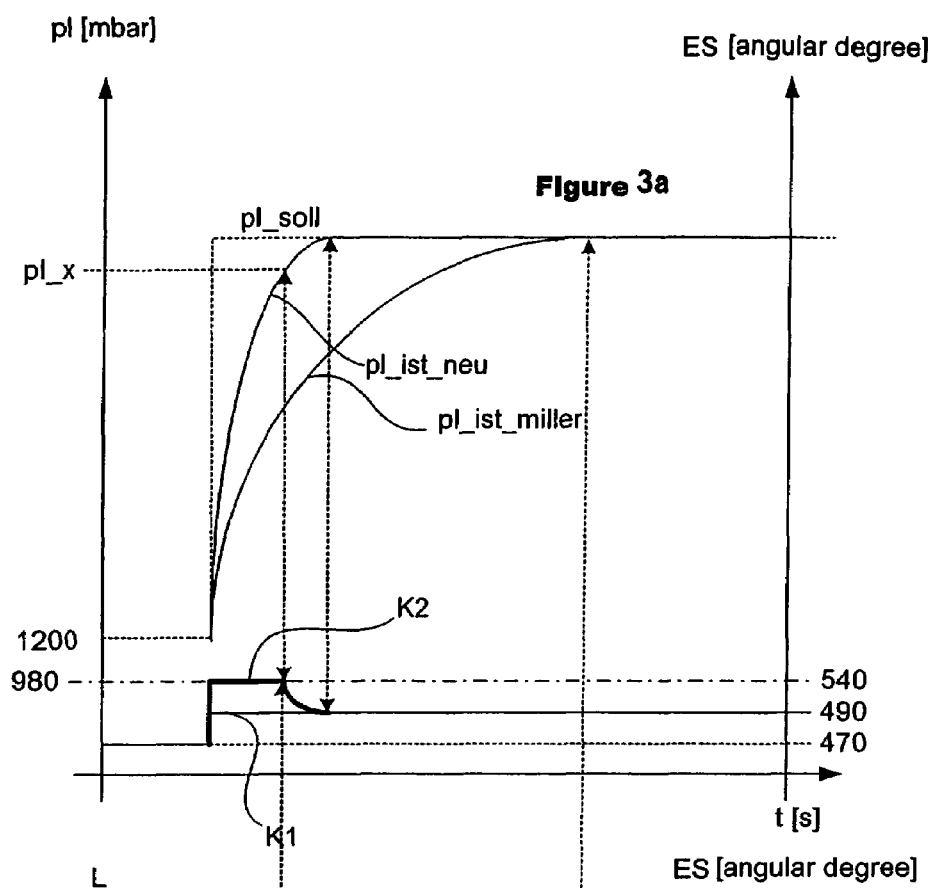
FIG. 3a is a diagram to illustrate the non-steady-state behavior of an internal combustion engine with a valve drive mechanism which is completely variable at least on the intake side, with respect to the charge pressure in various charge control processes in accordance with the present invention.

FIG. 3a shows in a diagram, of the charge pressure pl over the time t, the different charge pressure behavior of an internal combustion engine with a charge control process according to Miller and with a charge control process according to the invention. Through the stepped curve of the theoretical charge L_soll and the theoretical charge pressure pl_soll associated with this theoretical charge L_soll, the theoretical values which are required based on the desire of the driver and which are determined via the motor control device as a function of the desire of the driver are predefined.

According to the Miller process described in the introduction, with driving of the variable valve drive mechanism 4 according to the early intake closure charge control process also already explained in the introduction, the charge pressure is increased to a predefined value and the desired charge amount is supplied to the combustion space in this manner. For example, a charge pressure curve according to pl_ist_miller develops.

Finally, according to the invention, upon recognition of a positive sudden variation in the charge the valve open time is immediately lengthened with at least partial utilization of the open time reserve t_res and due to the fact that furthermore the present charging device is always operated with increased, preferably with the maximum possible, charge capacity, an increase in charge pressure which is faster in comparison to the prior-art processes and a clearly faster reaching of the theoretical charge L_soll are achieved. Thereby, a sufficient charge amount has already been provided before reaching the theoretical charge pressure pl_soll so that with charge pressure increasing further up to the theoretical charge pressure pl_soll as of that time the open time reserve t_res used can be built up once again in the following cycles. For example, a charge pressure curve according to pl_ist_neu develops.

Along with the developing charge pressures pl, the opening behavior of the intake valves (intake closure angle over time) is represented in the diagram according to FIG. 3a in its lower part. Therein the valve open time is re-set with the Miller process for providing the required minimum charge amount during the operation of the charger by the intake closure control time being shifted from 470 degrees to 490 degrees (curve K1).

According to the process according to the invention, the valve open time is, in reaction to a positive sudden variation in the charge, immediately lengthened using the open time reserve and thus a charge amount increased in comparison to the required minimum charge amount is supplied to the combustion chamber and with that the theoretical charge pressure pl_soll still not developed is compensated in part or completely. In the represented example there is a shift of the intake closure control time, instead of from 470 degrees to 490 degrees, from 470 degrees to, for example, 540 degrees (curve K2). Thus, with charge pressure which is increased or already at the maximum, a steeper increase in charge pressure is achieved and the desired theoretical charge amount L_soll is already provided before reaching the theoretical charge pressure pl_soll. Upon reaching the desired theoretical charge amount L_soll the valve control times will be recovered in the following cycles so that a sufficient reserve for an additional positive sudden variation in the charge is available immediately.

Figure 3B:
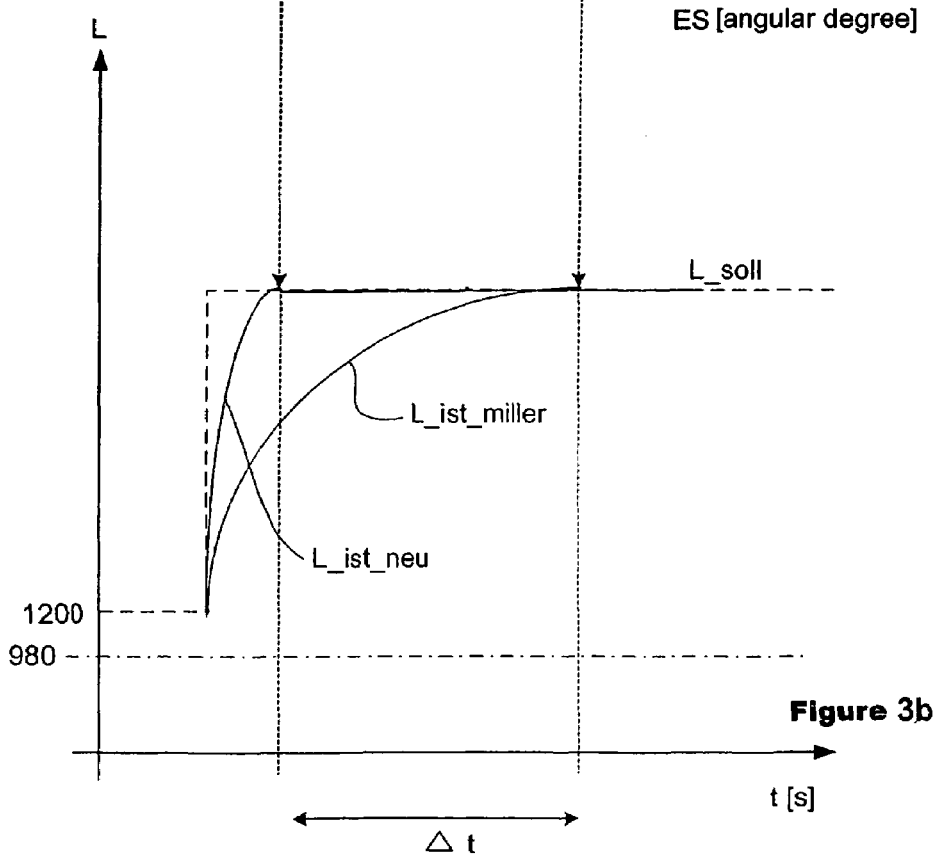
FIG. 3b is a diagram to illustrate the non-steady-state behavior of an internal combustion engine with a valve drive mechanism which is completely variable at least on the intake side, with respect to the charge amount supplied to the combustion space in various charge control processes in accordance with the present invention.

FIG. 3b shows in a diagram, of the charge amount L over the time t, the different charging behavior of an internal combustion engine with a different charge control process analogous to FIG. 3a. The gained time advantage At of the process according to the invention vis-à-vis the charge control process according to Miller can be seen clearly.

Through the process according to the invention a control edge correction as a function of the actual charge pressure is significantly improved and a time advantage in the development of a required charge (based on a positive sudden variation in the charge) vis-à-vis known processes is achieved.

FIG. 4 shows a bar diagram to illustrate the process according to the invention. The first bar (bar is proportional to the charge) represents a starting state with a steady-state charge L_ist during the charging operation. To provide the steady-state charge, definite intake closure control times (ES) with a corresponding charge pressure are set. Based on the desire of the driver, with positive charge requirement a theoretical charge L_soll according to the second bar develops, which is increased in comparison to the first bar by the charge difference due to the charge requirement. According to the invention the positive charge requirement is addressed by the intake valves immediately being driven in such a manner that the available control times and/or stroke reserve of the intake valves are/is used, at least in part, and at the same time the charge pressure is increased again. If the required theoretical charge L_soll is reached and a new actual charge L_ist_neu corresponding to the charge requirement has developed (second bar with surface area equal to the third bar), the charge pressure is further increased and the reserve used is simultaneously restored. The newly developed actual charge L_ist_neu, with reserve once again built up, is represented in the third bar with increased new actual charge pressure and the intake closure control time originally present.

The invention is described above in the example of a fully variable valve drive mechanism (for example, electromagnetic or hydraulic variable valve drive mechanism). It is, however, not restricted to the example described but rather can obviously also find application in all the other variable valve drive mechanisms, thus also in valve drive mechanisms with cam shafts which can be adjusted with respect to valve control times and/or valve stroke.

The foregoing disclosure has been set forth merely to illustrate the invention and is not intended to be limiting. Since modification of the disclosed embodiments incorporating the spirit and substance of the invention may occur to persons skilled in the art, the invention should be construed to include everything within the scope of the appended claims and equivalents thereof.

What is claimed is:

1. A process for operating an internal combustion engine with a charging device and with an intake valve drive mechanism, said intake valve drive mechanism being variable with respect to at least one of intake valve opening time and intake valve stroke, comprising the steps of:
   recognizing a positive charge requirement during the operation of the charge device;
   upon recognition of the positive charge requirement, driving the at least one variable intake valve drive mechanism such that at least one of an available stroke reserve and an intake closure control time reserve is utilized to increase a charge amount to be charged to a cylinder of the internal combustion engine, and
   upon reaching a target charge predefined by the positive charge requirement, the at least one variable intake valve drive mechanism is driven to restore the at least one of the available stroke reserve and the intake closure control time reserve to an original amount of reserve existing prior to the recognizing step.

2. The process according to claim 1, wherein the charging device is operated to provide a maximum possible charge pressure.

3. The process according to claim 2, wherein in the driving step, the at least one variable intake valve drive mechanism is driven, with respect to at least one of a stroke of a variable intake valve and an intake valve control time in steady-state operation, such that only a minimum charge amount required to meet a present charge requirement is provided to the internal combustion engine cylinder.

4. The process according to claim 1, wherein in the driving step, the at least one variable intake valve drive mechanism is driven, with respect to at least one of a stroke of a variable intake valve and an intake valve control time in steady-state operation, such that only a minimum charge amount required to meet a present charge requirement is provided to the internal combustion engine cylinder.

* * * * *